UNITED STATES PATENT OFFICE.

RICHARD M. ATWATER, JR., OF SCARSDALE, NEW YORK.

PROCESS OF CONCENTRATING COPPER VALUES.

1,175,331. Specification of Letters Patent. Patented Mar. 14, 1916.

No Drawing. Application filed June 17, 1915. Serial No. 34,654.

*To all whom it may concern:*

Be it known that I, RICHARD M. ATWATER, Jr., a citizen of the United States, residing at Scarsdale, in the county of Westchester and State of New York, have invented certain new and useful Improvements in Processes of Concentrating Copper Values; and I do hereby declare the following to be a full, clear, and exact description of the invention, such as will enable others skilled in the art to which it appertains to make and use the same.

This invention relates to a process for concentrating copper values especially adapted for use on copper tailings, and has for its object to provide a method of recovering said values in a manner more efficient and less costly than has heretofore been proposed.

With this and other objects in view the invention consists in the novel steps and combinations of steps constituting the invention, all as will be more fully hereinafter disclosed, and particularly pointed out in the claims.

In order that the invention may be clearly understood, the following general statement of conditions that exist at the so-called "porphyry" copper mines located in Utah, Nevada, New Mexico and Arizona, is made. The ore produced from these mines contains say from 15 to 50 lbs. of copper in the form of copper sulfids, carbonates, silicates and oxids. The sulfids, chalcocite, $Cu_2S$, and chalcopyrite, $CuFeS_2$, predominate, and their values are commercially recoverable from the ore, by modern methods of concentration, up to say 95 per cent. thereof. The carbonates, silicates and oxids, however, have lower specific gravities, and their values are not so efficiently recovered by the above methods. A 50 per cent. recovery of them is considered unusually high.

The mills of the "porphyry" copper companies probably treat between 15,000,000 and 20,000,000 tons of these ores per annum, and they probably have ore reserves of like character totaling over 600,000,000 tons. Already over 50,000,000 tons of such ores have been treated, and the recoveries of their copper contents have averaged say about 70 per cent. so far. The "tailings" or residues already made from these ores, and containing about 30 per cent. of their copper contents, have been disposed of by running them out into great dams and heaps, it being necessary to keep them out of the rivers, in order to avoid litigation. These said tailings contain from say 5 to 15 lbs. of copper per ton, and perhaps two-thirds of this copper or from 4 to 10 lbs. thereof is in the form of carbonates, silicates and oxids, the balance being in the form of sulfids. But copper carbonates, silicates, and oxids are soluble in sulfuric acid, and many methods have been devised for their treatment, but these methods usually have as their basis the leaching of the ore with sulfuric acid in tanks, vats, or heaps, and the subsequent extraction of the copper from the filtered, or clarified solution by use of precipitating agents, such as scrap iron for example, or by electrolysis. According to this invention, on the other hand, I apply the sulfuric acid to the tailings as they lie on the ground, sprinkling the acid, in a suitable state of dilution and in a limited volume, over their surfaces at intervals of time dependent upon the depth, the consistency, the metal contents and especially upon the state of the weather. The exact amount of acid for any given case is best determined by experiment. This is easily done by sprinkling any predetermined volume of a solution of a given strength over a segregated portion of the tailings to be treated, and observing the effects. From the results thus obtained the most economical quantity of solution per ton of ore and its strength can be readily fixed. As a rough approximation, one may start with a quantity of solution per ton of tailings, containing by weight as much sulfuric acid as there is copper per ton, in said tailings. In other words, if a ton of tailings contain 10 lbs. of copper, a convenient solution may contain 10 lbs. of sulfuric acid in the quantity of solution that is sprinkled on each ton. The dryness of the climate, and consequent strong evaporation of moisture from the earth's surface causes the copper sulfate formed from the diluted sulfuric acid, to rise to the surface by capillary attraction, and to form by a sort of efflorescent action a crust of impure copper sulfate, which is removed by any suitable mechanical means, such as scrapers and carried to a central point, where it may be sold direct to copper refiners, or it may be further washed, or treated, or refined, before selling.

A practical manner of carrying out this method of copper concentration, consists in leveling and blocking out the tailings heaps by means of a plow and scraper, in much the same way as truck farms are laid out, and then running a light industrial railway track around the blocks thus produced, to facilitate the transport of the acid and of the concentrated product produced by the treatment. The acid is carried in suitable containers, is run alongside the plot to be sprinkled, and is conveniently applied with a hose, care being taken not to disturb the plane surface more than is necessary. As soon as the crust has formed sufficiently, which may take from say, one to ten days, according to the weather, it is removed by hand, preferably using scrapers. The heaps of "concentrates", after being scraped together are loaded on to cars and run to the central plant. Here the "concentrates" can be placed in tanks when desired, and redissolved, the residue being chiefly sand. The copper may then be extracted from the solution by suitable reagents, by electrolysis, or it may be recovered as copper sulfate by evaporation. But when the concentrates are sufficiently pure, they can be sold as such.

It will be understood that the crudest kind of sulfuric acid solutions may be used in this process, and that therefore, in some cases it will be convenient to form said solutions from the smelter fumes, and thus aid in abating the nuisances produced by such fumes.

This process of producing concentrates from copper tailings is greatly facilitated by a dry or desert climate. In fact, the process involves the utilization of the dissolving action of sulfuric acid on the copper values, on the one hand, and the natural phenomena which causes evaporation, efflorescences, and crystallization of said values on the other hand. So that it is important that the process be carried out in a climate sufficiently hot and dry to effect a commercial saving over the methods now in use. Such climate is found at the porphyry mines above mentioned, and of course in other places throughout the world.

This invention should be carefully distinguished from a method which has been heretofore proposed of recovering gold and silver from tailings after treatment of the ores by the well known cyanid process. Such gold and silver tailings have been treated with a weak cyanid solution in tanks, and the residue subjected to evaporation in the sun. But the chemistry involved is of necessity very different from that involved in the process above. Further, in my process, no substantial natural efflorescence and concentration would take place unless sulfuric acid is first added to the tailings, for the mill water has carried off substantially all the readily soluble salts. In the case of cyanid tailings, no such action of mill water has been had, and the substances present being largely water soluble, efflorescence will naturally go on to an extent depending on the amount of water and cyanid solution present. Again, my process utilizes physical laws in that the sulfuric acid dissolves the solid copper carbonates, silicates, and oxids, thus permitting said solids in solution to be raised to the surface of the heap by capillary attraction, and after reaching said surface evaporation and efflorescence completes their concentration, without further chemical change. No such raising of insoluble solids occurs at all in the cyanid process. Further, it probably takes one tenth of an ounce of sodium cyanid per ton of tailings containing say one tenth of an ounce of gold, to carry out the cyanid process, while a ton of copper tailings carrying say ten pounds of copper would take only under favorable conditions, say, ten or fifteen pounds of sulfuric acid.

This invention should also be carefully distinguished from the various leaching processes heretofore employed on copper bearing ores. In none of these processes are the copper values recovered from the heaps in a solid or semisolid condition, but only in a state of solution, and therefore, it is not necessary to block out the tailings, or ores, and to prepare the surfaces for the later scraping action, as is the case in this invention.

It is obvious that those skilled in the art may vary the details of my process without departing from the spirit of the invention, for example in some cases low grade ores may be substituted for the copper tailings, and I therefore do not wish to be limited to the above disclosure, except as may be required by the claims.

What I claim is:—

1. The process of concentrating the copper values carried by copper tailings, which consists in treating said tailings in heaps with sufficient sulfuric acid to dissolve a substantial portion of their copper values; causing said values to be brought to the surface of said heaps by capillarity and to re-assume the solid state by evaporation; and suitably removing from said heaps the concentrates thus produced, substantially as described.

2. The process of concentrating the copper values carried by copper tailings, which consists in treating said tailings in heaps with sufficient crude sulfuric acid to dissolve a substantial portion of their copper values; exposing said heaps to the action of the sun in a dry atmosphere and thereby causing said values to be brought to the surface of said heaps by capillarity and to re-assume the solid state by evaporation; and suitably removing from said heaps the concentrates thus produced, substantially as described.

3. The process of concentrating the copper values carried by copper tailings, which consists in piling said tailings in heaps; smoothing off the surfaces of said heaps to facilitate subsequent scraping actions; treating said tailings with sulfuric acid to dissolve a substantial portion of their copper values; causing said values to be brought to the surface of said heaps by capillarity and to re-assume the solid state by evaporation; and suitably removing from said heaps the concentrates thus produced, substantially as described.

In testimony whereof I affix my signature, in presence of two witnesses.

RICHARD M. ATWATER, Jr.

Witnesses:
S. H. Marsh,
W. M. Cohen.